J. FORBES.
Skates.
No. 5,660. Reissued Nov. 18, 1873.
FIG. I.
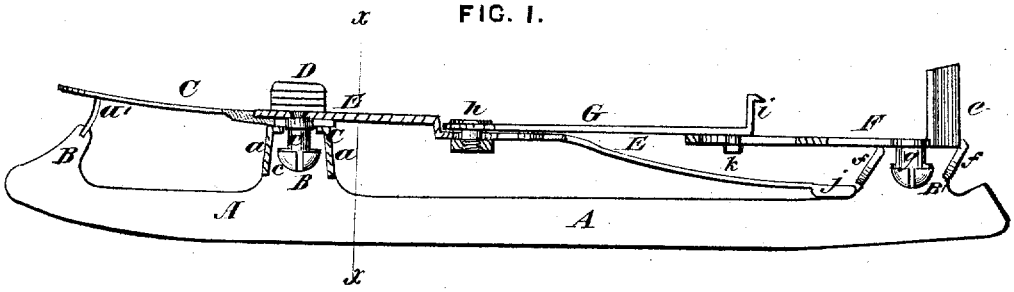
FIG. III.
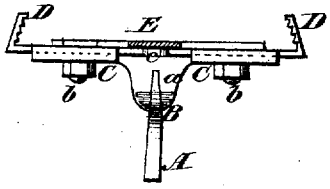
FIG. II.
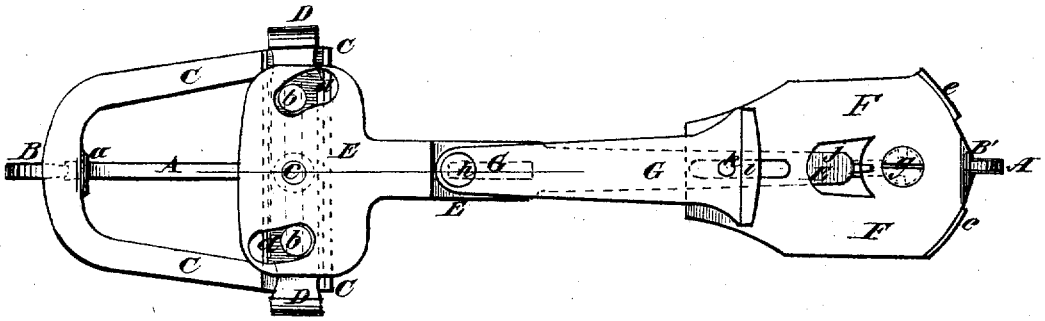
Witnesses:
Jam. F. Smith
James A. Hunter
Inventor:
John Forbes
AM. PHOTO-LITHOGRAPHIC Co. N.Y. (OSBORNE'S PROCESS).

UNITED STATES PATENT OFFICE.

JOHN FORBES, OF HALIFAX, NOVA SCOTIA.

IMPROVEMENT IN SKATES.

Specification forming part of Letters Patent No. 69,649, dated October 8, 1867; reissue No. 5,660, dated November 18, 1873; application filed June 23, 1873.

*To all whom it may concern:*

Be it known that I, JOHN FORBES, of Halifax, Province of Nova Scotia, have invented certain new and useful Improvements in Skates; and I do hereby declare that the following is a full, clear, and exact description thereof, reference being had to the drawings accompanying this specification and forming part of the same.

My invention consists, first, in forming the drops or brackets for supporting the runner out of the frame by punching out and bending down the same; second, in forming the transverse box within which the lugs slide out of the frame by punching out and bending up the same; third, in securing the runner to the plates by means of slot-headed buttons or studs, one of which, at the same time, forms a fulcrum for one of the levers.

In the drawings, which serve to illustrate my improvements, Figure 1 is a side elevation, partly in section, of a skate constructed according to my invention. Fig. 2 is a plan or top view of the same. Fig. 3 is a vertical transverse section of the same, the plane of section being indicated by the line *x x*, Fig. 1.

A represents the runner of a skate containing my improvements. B B′ are posts or standards secured to or formed on the runner. Upon the post B is secured a horizontal sheet-metal plate, C. It is secured by means of drops *a a*, which are punched out and bent down, still being parts of the plate, and which fit over the post B, as shown. These drops *a* may be slotted so as to fit over the post B in the manner shown in Fig. 3, or they, as well as the post, may be slotted as at *a′*, Fig. 1. In the rear of the plate C is also formed, by punched-out and bent-up edges, a sort of a horizontal transverse box or channel, in which two metal lugs, D D, are placed and allowed to slide freely. These lugs are made of angular form, their horizontal parts being fitted in the channel in plate C, and the inner sides of their vertical parts are serrated and inclined inward, so that they may more conveniently clamp the sides of the sole of a boot or shoe. The lugs D D have each an oblong slot in their horizontal parts, and similar slots are made in the channel in plate C for bolts *b* to pass through, said bolts serving as guides for the lugs, and the bolts and oblong slots admitting of the lugs being adjusted laterally according to the width of the sole. E represents a plate, which is secured, by a button, *c*, to the post B, said button passing through a hole provided in the plate C. In the post B is provided a T-shaped slot for holding a slot-headed button, *c*. The latter has a head at its lower end in which are two slots opposite to each other, so that when these slots are in line with the runner the button may be moved down through the narrow part of the recess in B; then, when the head arrives in the broader part of the slot, the button, or, rather, the plate E, to which it is firmly secured, is turned so that the head comes under the shoulder of the slot in B, and thus all the parts, E, D, and C, are held down to the runner, and can be removed by drawing out the plate E with its button *c*, when the drops *a* will no more secure the plate C to the runner. In the plate E are two curved slots, *d d*—one in advance and the other in rear of the central transverse line of the channel in plate C—and the heads which are on the bolts *b b* fit into these slots *d d*. Thus, by turning the plate E the bolts *b* will be moved either outward or inward, and, with them, the lugs D D, and so the sole can be secured or released by the movement of the lugs. These lugs, when adjusted, and when the nuts on the bolts *b* are drawn tight, are not capable of lateral movement, but they can turn on the bolts *b b*. F is the heel-plate, made of sheet metal, and provided with jaws *e e* formed near its rear edge. It has also drops *f f*, formed precisely as the drops *a* are formed on plate C, said drops *f f* fitting upon the post B′, as shown. A button, *g*, of similar construction as the button *c*, fitting into a T-shaped recess in B′, and turning loose in F, secures the latter to B′.

I claim—

1. The bent drops or brackets, formed out of the skate-frame, for supporting the runner, substantially as described and shown.

2. The transverse box or channel, constructed out of the frame by punching out and bending down, substantially as described.

3. The slot-headed button, in combination with the heel or toe plates and slotted posts of the runner, substantially as described.

JOHN FORBES.

Witnesses:

SAM. TRO. SMITH,

JAMES H. HUNTER.